Dec. 31, 1968 C. H. HAGEL 3,419,162

HELICAL ELEVATOR AND STORAGE BUILDING ARRANGEMENT

Filed June 7, 1967 Sheet 8 of 8

United States Patent Office 3,419,162
Patented Dec. 31, 1968

3,419,162
HELICAL ELEVATOR AND STORAGE BUILDING ARRANGEMENT
Carl Heinrich Hagel, 24 Eintrachtstrasse, Dortmund, Germany
Continuation-in-part of applications Ser. No. 442,645, Mar. 25, 1965, and Ser. No. 594,826, Nov. 16, 1966. This application June 7, 1967, Ser. No. 644,270
Claims priority, application Germany, Apr. 13, 1964, A 3,186
11 Claims. (Cl. 214—16.1)

ABSTRACT OF THE DISCLOSURE

This specification describes a novel elevator means comprising a load-supporting member pivotally mounted on an undercarriage. The undercarriage is supported on a helical track through outwardly extending arms which grasp the track through a three-wheel combination. Means are described to put a load onto or take such load off the elevator. A building arrangement particularly suited to use as an automobile parking garage is described in combination with the helical elevator.

This application is a continuation-in-part of application Ser. No. 442,645, filed Mar. 25, 1965, and application Ser. No. 594,826, filed Nov. 16, 1966.

This invention relates, in general, to elevators and building structures which are arranged to accommodate elevators, and more particularly to an elevator and building structure arrangement having a helical track upon which an elevator load carrier is guided and moved up and down for conveying load items, such as vehicles, between various levels of the building.

For the purpose of illustration and example, the description of the invention herein is centered around a particular application, specifically, the use of an elevator and building arrangement according to the invention which is particularly adapted for the storage of vehicles, such as automobiles. However, as will be appreciated by those skilled in the art, the elevator and building arrangement according to the instant invention can be used for numerous other purposes, as for warehouses, and can readily be adapted for such other uses in an obvious manner. Furthermore, the elevator construction according to the invention is suitable for general use by itself; for example, where it is desired merely to transport persons to an elevated observation position.

In the construction of multi-story garage buildings, it is known to arrange the storage spaces or chambers for accommodating vehicles in an annular ring around an elevator shaft which serves for the guidance of a vehicle carrier or lift having a rotatable vehicle support platform. By using a rotatable vehicle support platform in such a prior art arrangement, a vehicle can be brought into the building along a selected path leading to the elevator shaft, transferred onto the vehicle carrier, raised or lowered to a selected storage level, and transferred thereat to an unoccupied storage area, with the support platform being rotated so that the vehicle can be moved in a straight line from the carrier into the intended storage area. To remove vehicles from their storage areas in the building, this procedure is reversed.

It is further known to arrange an elevator in garages, which moves up and down on a helical path in a vertical cylindrical well, with rotation at the same time around the axis of the well. The storage chambers are arranged radial to the well and on a helical ramp which encircles the well. The load on the elevator rotates with the movement of the elevator, so that the drive speed is limited because of the centrifugal force having effect on the load.

It is therefore an object of the invention to provide an elevator arrangement that is suitable for transferring vehicles and other load items between various storage area levels in a building.

Another object of the invention is to provide an elevator arrangement as aforesaid which is relatively free from excessive wear on its movable parts, so as to require a minimum amount of inspection and maintenance.

Still another and further object of the invention is to provide an elevator arrangement in combination with a building having storage areas which are radially aligned with respect to the elevator so as to permit vehicles to be transferred between the elevator and such storage areas along straight radial paths.

Another object of the invention is to provide an elevator having means for transferring vehicles and other load items between a load carrier and adjacent areas of various levels in a storage building.

Other and further objects of the invention will become apparent from the following detailed description, the accompanying drawings, and the claims hereof.

Fulfilling these objects, one aspect of this invention resides in providing a load-supporting platform so constructed and arranged that while the elevator as a whole is moving up and down, the load-supporting platform is rotatable independently from the elevator. Thereby, it is possible to compensate inaccuracies of the angular position of the undercarriage, running on the helical path, which can arise after a certain time of operation in that the wheels show slip. Furthermore, portions of the building surrounding the elevator shaft can be easily reached regardless of their location because the elevator of the invention can be adjusted to each height and angular position by its independently rotatable load carrier. This is of particular importance for storehouses with shelf installations where every single shelf must be accessible.

A substantial increase of the driving speed, and thereby the efficiency of the elevator, can be provided by the fact that the upper rotatable platform is driven in a direction opposite to the undercarriage. If the rotation of the upper part in an opposite direction is of the same angular speed as the rotation of the lower part, the load on the upper part maintains its angular position with respect to the building surrounding it. Since centrifugal forces are no longer a factor with respect to the elevator load, extremely high driving speeds can be realized.

Accordingly, the invention is adaptable to several alternative embodiments and variations thereof. For example, the helical track can be of open construction, as a coil spring with spaced-apart turns, and mounted within a cylindrical well passage provided in a building, with the load carrier being mounted inside of the track and movably supported thereby so that the load carrier can be displaced along the direction of the track longitudinal axis by rotating the undercarriage relative thereto. In this embodiment, the load carrier moves along the track axis in the manner of a male threaded member in a female threaded hollow member.

Alternatively, the load carrier can be constructed in a completely annular, or segmental annular form and supported on the outside of the guide track so as to be axially movable in the manner of a female threaded nut on a male threaded screw. In this case, the helical track can be mounted to the outside of a cylindrical multi-story structure which is preferably of open construction so that vehicles can be transferred from the load carrier into storage areas provided at the various levels inside the structure.

If desired, an elevator arrangement according to the invention can be provided which has an annular load carrier that is movable up and down within an annular well provided inside of a building. Such an arrangement will permit the transfer of a load between the load carrier and storage areas bordering on both the outer and inner boundaries of the annular well.

It is preferable to use an undercarriage which is connected to the load carrier and which has wheels that engage the track to support and drive the load carrier. In such a case, the wheels are journaled to arms which extend from the undercarriage, with said arms having lengths and attitudes which enable the load carrier to be supported by the undercarriage in a substantially horizontally level attitude. The wheels are driven so as to rotate the undercarriage about the guide track axis, thereby causing said undercarriage to advance axially in the manner of a nut rotatably driven along a screw. By pivotally connecting the load carrier to the undercarriage and providing means for counter-rotating the load carrier with respect to the undercarriage, such as counter-rotation means responsive to the undercarriage wheel drive means, the angular position of the load carrier about the guide track axis can be made independent of the angular position of the undercarriage.

The elevator arrangement of the present invention also features an opposition load transfer mechanism which can be operated either under manual or automatic control to transfer vehicles and other load items between the load carrier and adjacent storage and receiving areas. The load transfer mechanism is supported by the load carrier so as to be capable of operation at each of the various storage levels serviced by the load carrier, and includes means for grasping and drawing a vehicle from an adjacent delivery platform onto the load carrier in a selected direction of alignment, and discharging said vehicle from the load carrier onto an adjacent receiving platform. Thus, where it is desired to place a vehicle in a selected elevated storage area in a garage building, the vehicle can be driven under its own power up to a delivery platform on a lower story of the building, drawn onto the load carrier by the transfer mechanism, and brought up on the load carrier to the level of the intended storage area. At this level, the load carrier is rotated by the counter-rotation means to align the transfer mechanism in the direction of the intended storage area so that when the vehicle is transferred to the receiving platform, it will be oriented in a direction that will permit it to be driven in a straight line into the selected storage area. To remove a vehicle in such an elevated storage area, it is only necessary to reverse the aforesaid procedure.

Understanding of this invention will be facilitated by reference to the accompanying drawing wherein.

Figures 3, 3A, 3B, 3C, 3D:
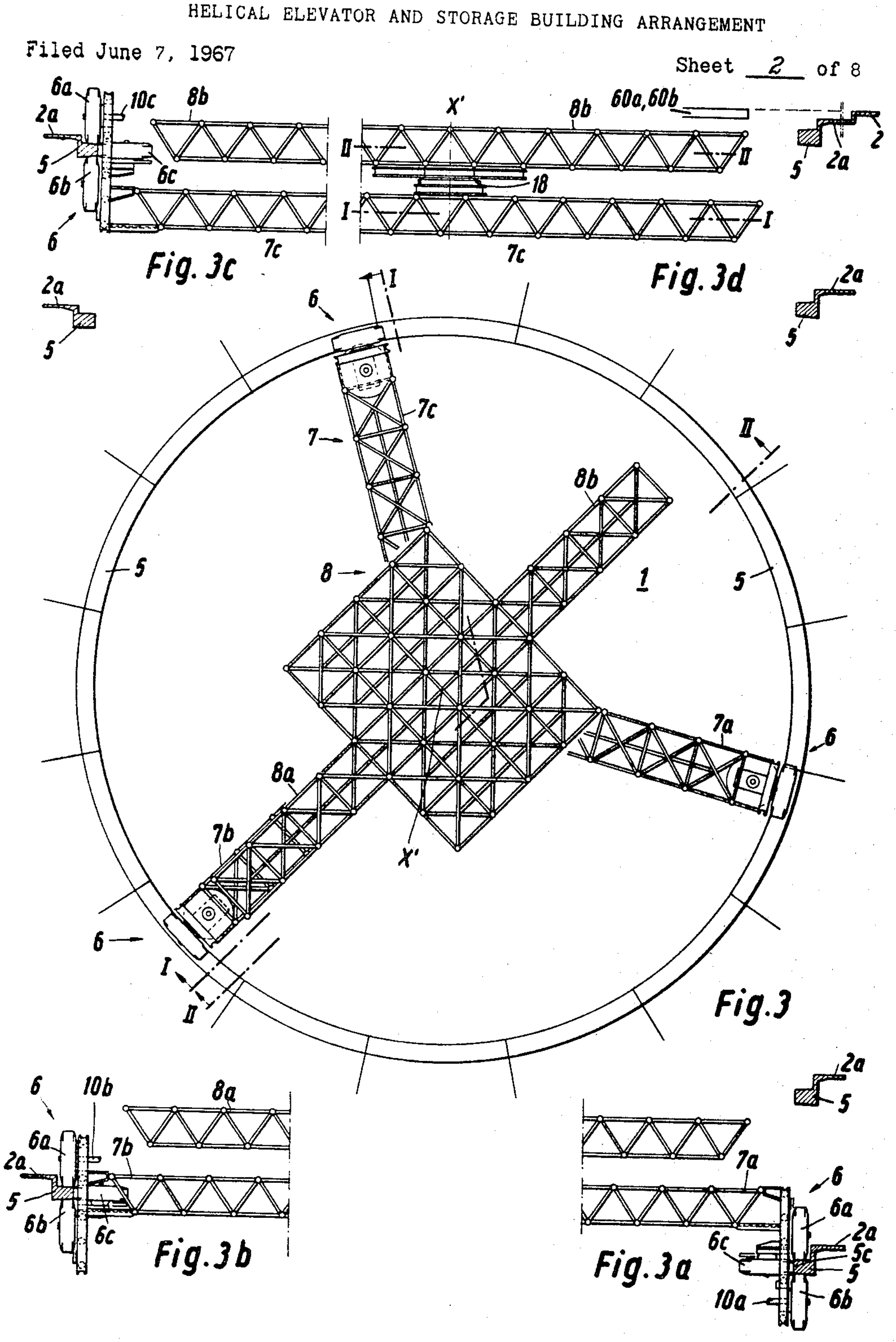
FIG. 3 shows a top view of the frame construction of the elevator's lower and upper part.
Figure 4:
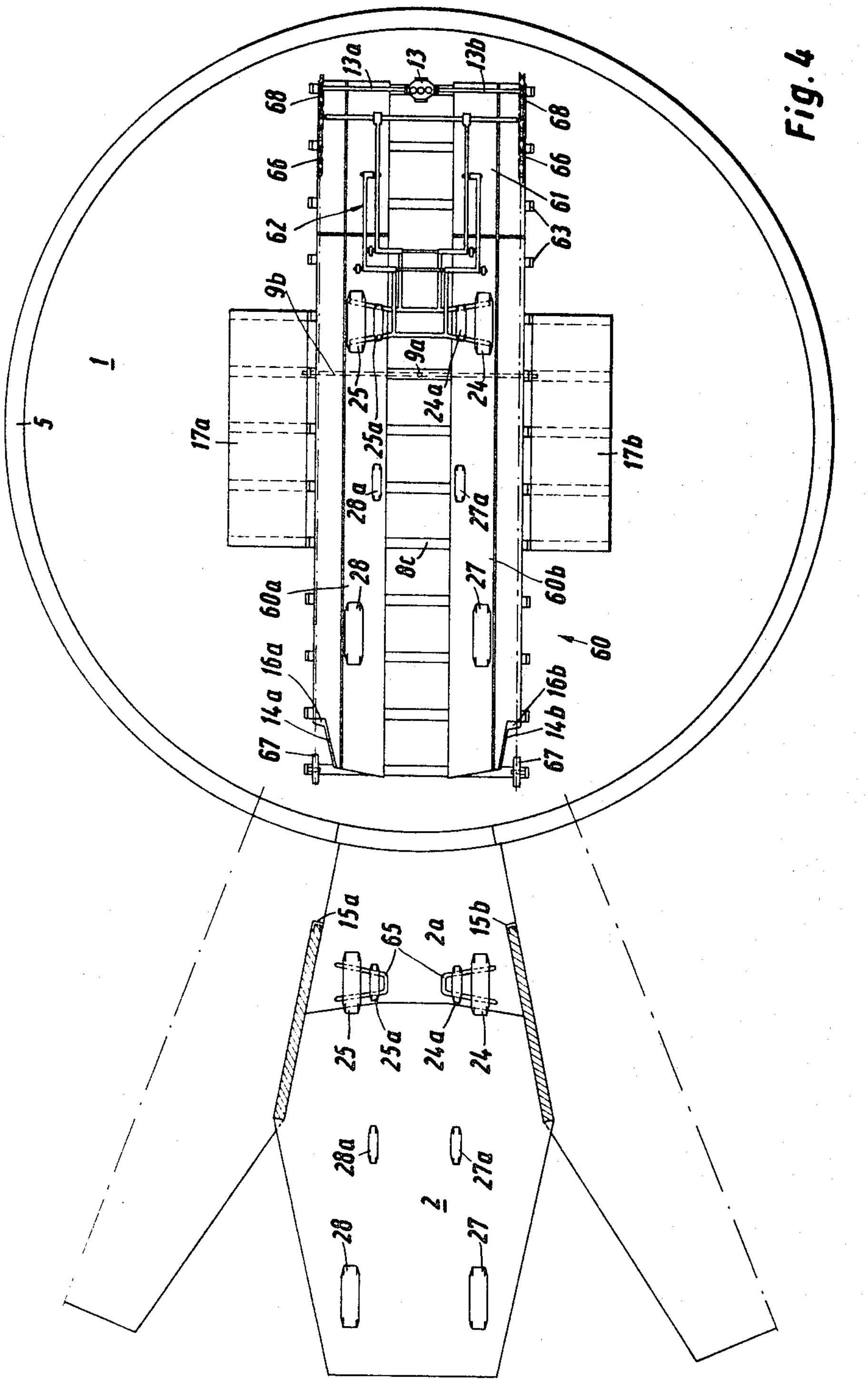
Figures 5, 6:
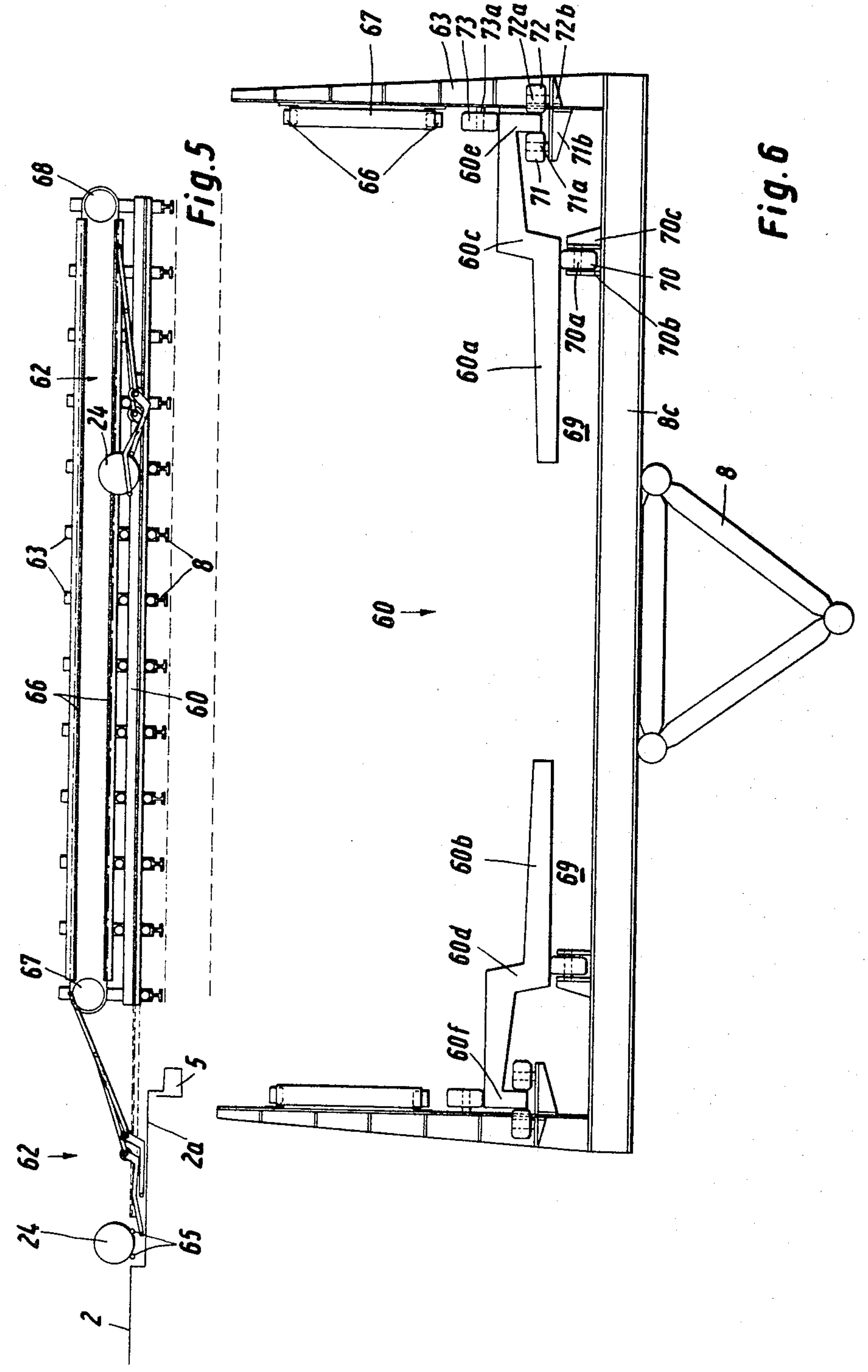
Figure 11A:
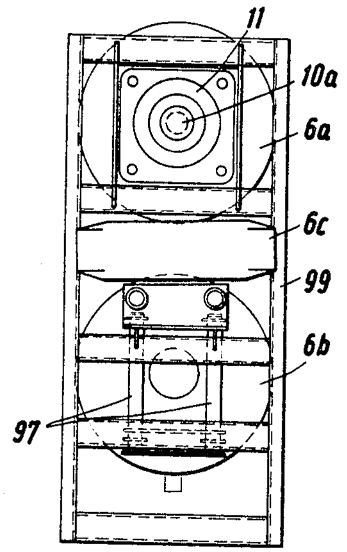
Figure 11B:
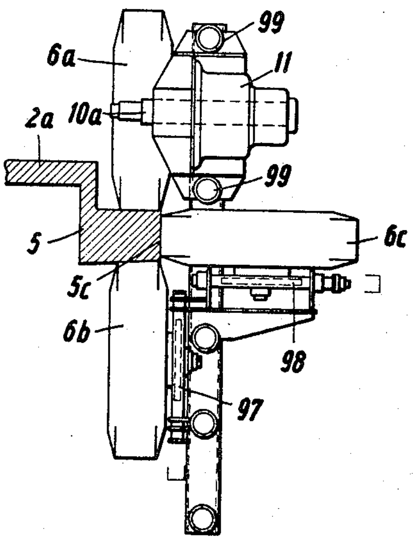
Figure 7:
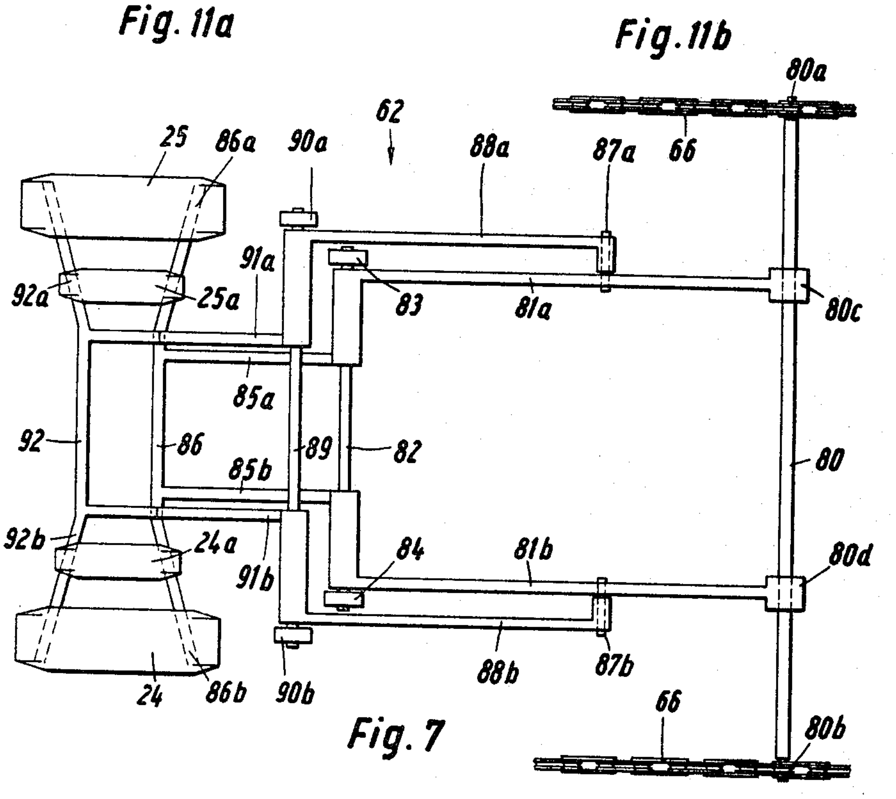
Figures 8A, 8B, 9A, 9B:
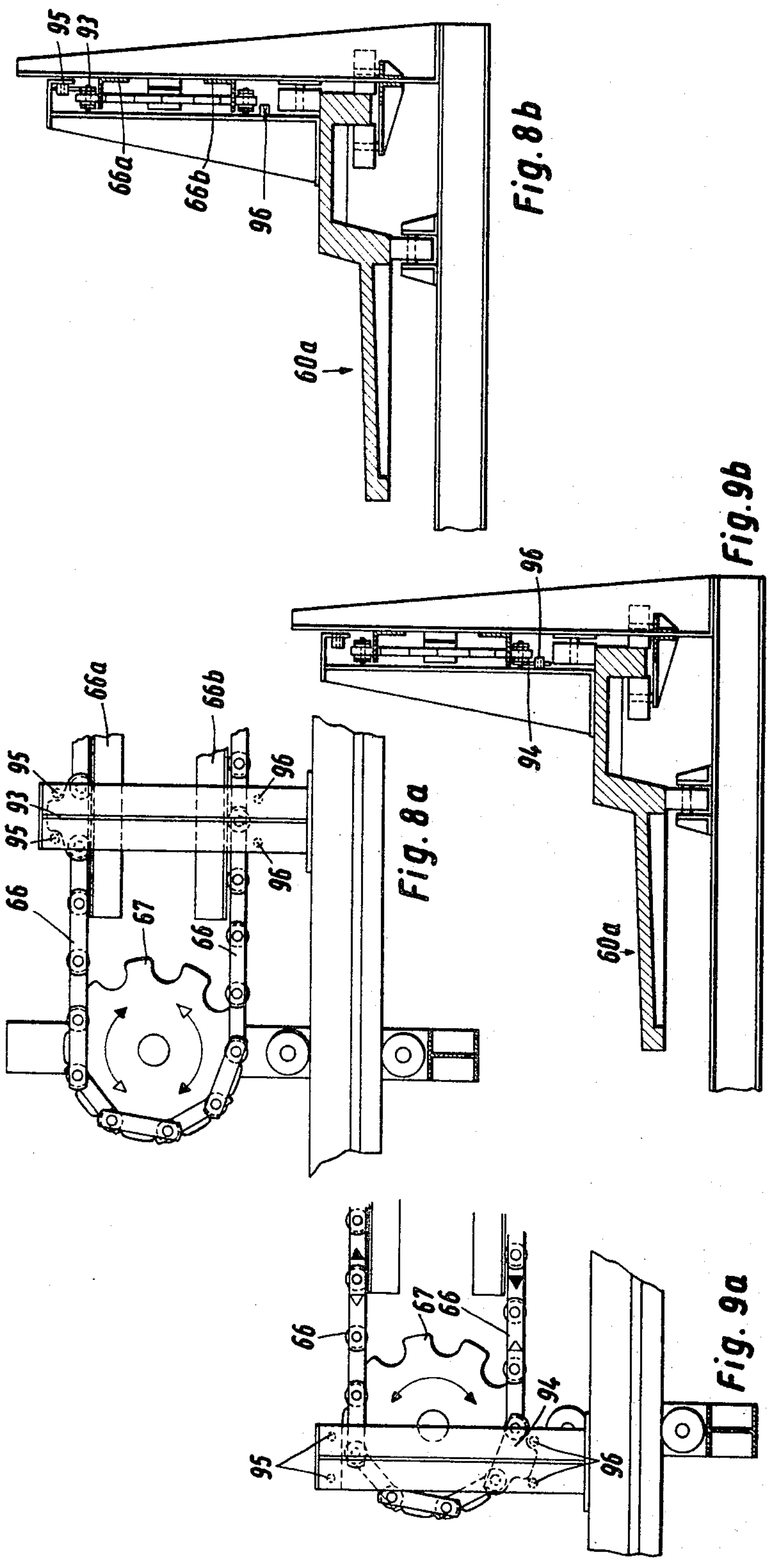
Figure 12A:
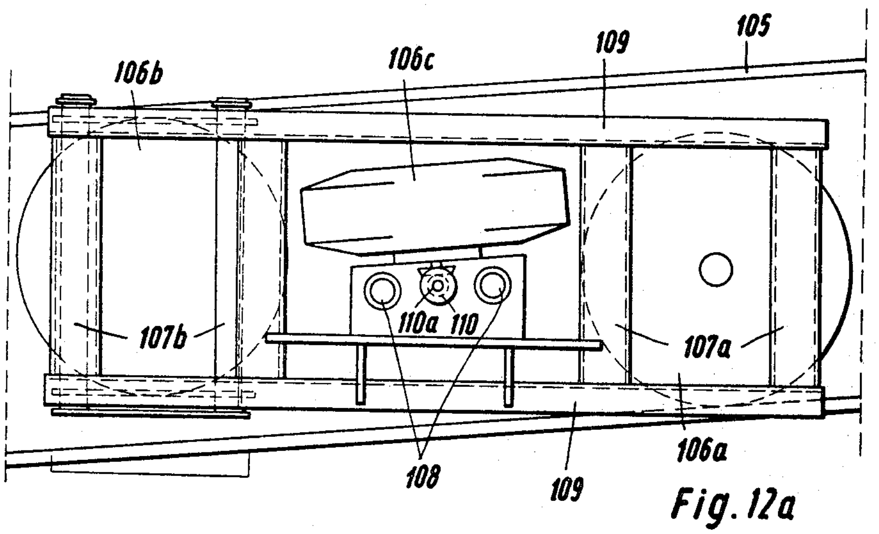
Figure 12B:
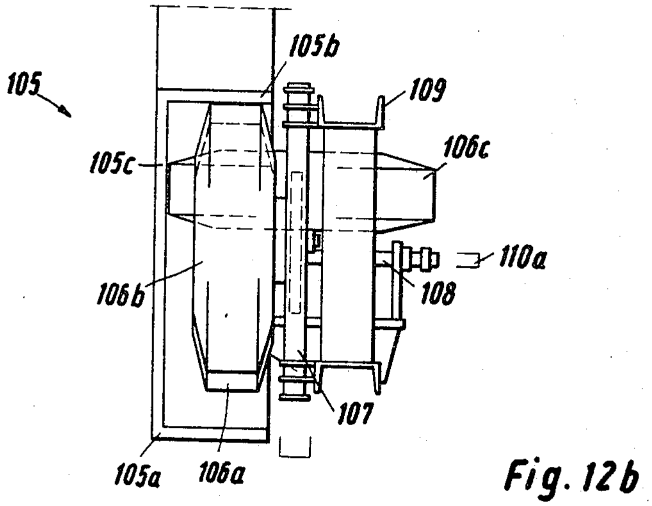

FIGS. 3*a*–*d* show individual views from the side of FIG. 3;

FIG. 4 shows a top view of the elevator;

FIG. 5 is a view from the side, in section, of the arrangement of FIG. 4;

FIG. 6 is a vertical section through FIG. 5 in an enlarged scale;

FIG. 7 shows a transfer mechanism for moving the car as top view;

FIG. 8*a* is a partial view from the side of the mechanism of FIG. 6;

FIG. 8*b* shows the arrangement of FIG. 8*a* partly in section;

FIG. 9*a* is in accordance with FIG. 8*a* and shows the arrangement with chain moved further;

FIG. 9*b* shows the arrangement of FIG. 9*a* in presentation analogous FIG. 8*b*;

FIGS. 10*a*–*h* illustrate the different phases of movement of the transfer mechanism when taking up a vehicle on the elevator;

FIG. 11*a* shows the arrangement of the wheels, which guide the undercarriage on the spiral track, seen radially to the circumference of the track;

FIG. 11*b* shows the same arrangement as FIG. 11*a*, seen, however, tangential to the track of the elevator;

FIG. 12*a* shows (seen in radial direction) a modified form of accomplishment of the arrangement of the guiding wheels, with formation of the helical track as channel, open on the inside, formed as a U; and FIG. 12*b* shows the same arrangement as FIG. 12*a*, seen in tangential direction.

Figure 1:
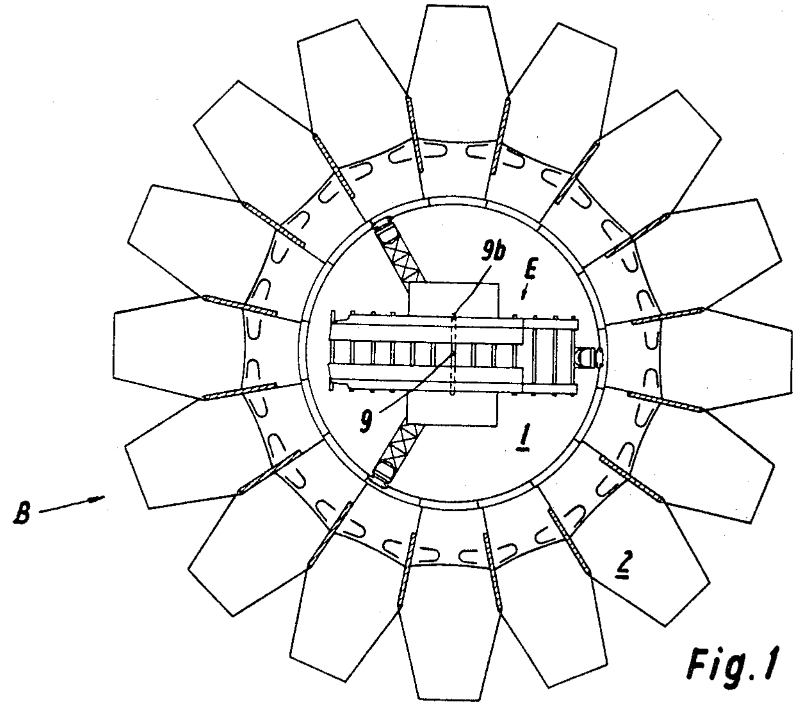
FIG. 1 shows a horizontal section through the building equipped with the elevator according to the invention on the line I—I in FIG. 2.
Figure 2:
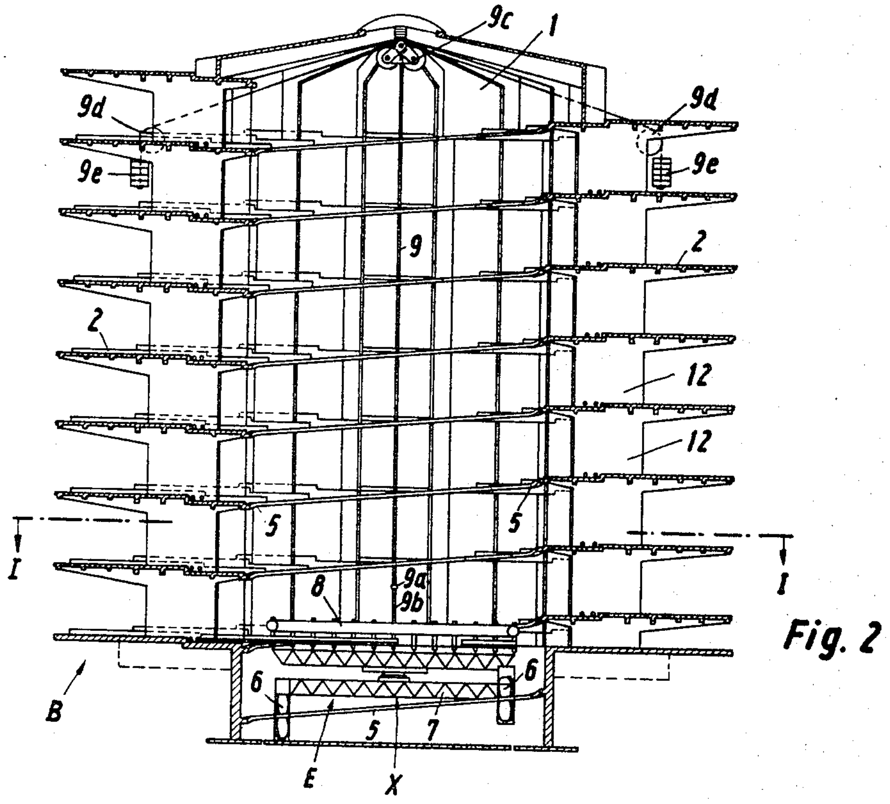
FIG. 2 is an elevation view, partly in section, of a storage building adapted for use in combination with the elevator according to a preferred embodiment of the invention, and showing a typical installation of the helical guide track therefor.

Referring now to FIGS. 1 and 2, wherein some of the details have been omitted for purposes of clarity, the building B accommodates an elevator E which travels up and down within a hollow cylindrical well 1 provided therein, said well being bordered by a helically wrapped floor 2, in an arrangement similar to that of a spiral ramp or staircase. The floor 2 is preferably provided with horizontal flat stepped portions arranged in radial symmetry with respect to the longitudinal axis X of the cylindrical well 1. These stepped sections, together with radial walls, define a plurality of storage area chambers 12, such as can be used for storing vehicles and other load items.

At the inner boundary of the floor 2 is affixed a guide track 5, which is part of the elevator E, which is likewise helical and concentric with the well axis X and also preferably vertical. The track 5 serves to guide a load carrying member in the form of a platform 8, which is also part of the elevator E, and which is driven up and down within the well 1 and is supported by said track 5 via roller wheels 6 which are journaled to frame arms 7 of an undercarriage.

Above the center of the load-carrier 8, a hoop **9*b* formed like a portal is fixed on which, by means of a rotating connection 9*a* on the vertical axis X, one or more ropes 9 are arranged which go upwards. The ropes run over pulleys 9*c*, journaled at the upper end of the well 1, to lateral return pulleys 9*d*, which are above vertical wells. In these wells, counterweights 9*e* are fixed at the ends of the ropes 9, which counterweights are movable within these vertical wells. The counterweights 9*e* preferably are chosen such that they compensate for the weight of the elevator E and for at least part of the load on the elevator, whereby the power required to drive the elevator E is reduced. The pivot-bearing, arranged between the parts 7 and 8 and formed as a conventional rotary-ring, is formed in such manner that the load carrier 8 cannot disengage from the undercarriage 7 because of upward force applied to the hoop 9*b***.

In FIG. 3, a top view of the construction of an elevator is described. The elevator consists of the undercarriage 7, preferably in the form of a three-armed, symmetrical star-shaped frame. The star-shaped arranged arms are numbered **7*a*, 7*b* and 7*c*. They extend from a middle-axis X', which is preferably identical to the axis X of the cylindrical well 1, each time spaced about 120° from the other. The running-wheel arrangements 6 are fixed at the ends of the arms 7*a*, 7*b* and 7*c* of the undercarriage 7. The running-wheel arrangements each consist of three (3) wheels, as will be explained further below, each of which run on the helical path 5, which surrounds the well 1**.

The load-carrier 8 is fixed on the undercarriage 7 of the elevator, rotatable around the axis X'. The load-carrier 8 is formed of a frame which is substantially perpendicular to the X' axis. Extensions 8*a* and 8*b* are provided from opposite sides of the platform, so positioned that one of these extensions is adapted to align with and override an arm of the undercarriage 7, while the other extension extends in opposite direction to bisect the angle between the other arms 7*a* and 7*b* of the undercarriage 7. The middle section of the load-carrier 8 may be widened to each side at 8*c* and thus serves for the accommodation of the elements necessary for the drive of the elevator, such as a motor, a pump, controls, etc.

The elevator E, consisting of the parts 7 and 8, essentially forms two volumetric frameworks, arranged one above the other and rotatable independently from each other. To provide that the elevator is level, the wheel arrangements 6 at the different arms 7*a*, 7*b* and 7*c* are, according to FIGS. 3*a*, 3*b* and 3*c*, mounted at different levels at the ends of the arms of the undercarriage 7. Thus, while the track 5 is helical, the elevator E is level.

FIG. 3*a* shows a wheel arrangement fixed at the end of the arm 7*a*. It consists of two wheels 6*a* and 6*b* disposed one above the other, which are rotatable around horizontal axes and which touch at the upper and lower surfaces of the track 5 protruding into the well 1. A wheel 6*c* is provided, at the vertical interior surface 5*c* of the track, laying at the inside, which is rotatable around a vertical axis and which accomplishes the centric guidance of the elevator E in the well 1. While any number of these wheels 6*a*, *b* and *c* may be driven, it is preferable that only one of them is driven. The drive-spindle of the wheel arrangements 6 are numbered 10*a*, 10*b* and 10*c*. It is within the scope of this invention to provide the wheels and track as generally smooth surfaces and thus rely upon friction drive or gear wheels and mating surface can be utilized. One or more of the wheel combinations can be driven.

As seen from FIG. 3*a*, the wheel arrangement 6 protrudes from arm 7*a* of the undercarriage 7 downwards. The arm 7*a* is positioned higher than the bottom 2 of the adjacent compartment. The load-carrier 8 is, at this point of the circumference, lower than the bottom 2 of the next higher floor.

In corresponding manner, the wheel arrangement 6 in FIG. 3*b* is generaly aligned with the arm 7*b*. The wheel arrangement, however, is fixed with respect to the guide track 5.

According to FIG. 3*c*, the third arm 7*c* is mounted below the wheel arrangement 6, the location where the wheel arrangement is fixed at the end of the arm 7*c*.

According to FIG. 3*d*, the bottom 2 of the adjacent compartment at the end 8*b* of the load carrier 8 is on the same level as the tracks 60*a* and 60*b*. At this place, therefore, vehicles can respectively be brought onto or taken from the load-carrier. By the configuration of the three-wheel arrangement 6*a*–6*c*, the elevator E is extended and supported in all three dimensions. While the wheels 6*a* support the weight of the elevator E under load condition, the wheels 6*c* prevent the elevator without load from being lifted up from the guide track 5 under the influence of the counterweights 9*d*. The wheels 6*c* keep the elevator E centric to the axis X.

The load-carrier of the elevator E of this invention is, according to FIG. 4, shorter in radial direction than the diameter of the well 1. A scaffolding 60 is provided on the frame 8 displaceable on rollers in a radial direction. The displaceable scaffolding 60 has two parallel tracks 60*a* and 60*b* to support the wheels of a vehicle to be transferred, as well as a transfer mechanism 62, which takes the respective vehicle by one pair of wheels, hoists it and pulls it onto or pushes it off from the scaffolding 60.

There is an intermediate space 69 provided between both tracks 60*a* and 60*b* of the scaffolding 60, as shown in FIG. 6. The purpose of this intermediate space will be explained later.

The scaffolding 60 is, as aforementioned, movable in a longitudinal direction. In the position shown in FIG. 4, the rear end of the scaffolding is supported on a scaffolding part 61 which is firmly connected with the load carrier 8. If the scaffolding is pushed towards the left from the position of FIG. 4, it bridges over the space between the frame of the elevator and the accommodation spaces 2 surrounding the well 1.

The breadth of the scaffoldings 60, 61 is chosen to adapt to vehicles of varying track sizes, from the widest to the narrowest. In FIG. 4, the front wheels of a big car, indicating the maximum track possible, are shown by 24 and 25. The back wheels of the same car are standing at 27 and 28 if the vehicle is loaded on scaffolding 60. The front wheels of a smaller car, which also can be adapted, are given at 24*a* and 25*a*. The back wheels of the same car, which shows an accordingly small wheel base, are at 27*a* and 28*a* after adapting.

Endless chains 66 are provided lateral to the scaffolding 60 and to the stationary scaffolding-part 61. These chains are provided on both sides of the scaffolding, are longitudinally displaceable, and rotate in a vertical plane (see FIG. 5). Supports 63 are provided, fixed on both sides of the load-carrier 8, to guide the chains 66. Chain wheels 67 and 68 are provided at each end, respectively, of each chain. These wheels are suitably bearing mounted. Both endless chains cause the backward and forward movement of both the transfer mechanism 62 and the movable part of the scaffolding 60. The chain-wheels 68, which are operatively associated with transmission axle-shafts 13*a* and 13*b* of a reversible motor 13, which motor is fixed on the scaffolding-part 61, whereby the chains are drivable in either direction.

As can be seen in FIG. 4, the compartments 12 surrounding the well 1 are provided, at the end towards the well 1, with two horizontally disposed hoops 65, which become more narrow from outside to inside and which are so formed to adapt to the front wheels of all vehicles accommodated in the compartments 12, independently of the vehicle size. In the left part of FIG. 4, the position of the front wheels 24 and 25 of a big car, or the position of the front wheels of a smaller car, 24*a*, 25*a*, are shown. Because of the placement of the hoops 65, the front wheels of each vehicle are aligned in the compartments so as to provide the same distance therefrom to the middle axis X' of the elevator. Two inclined guiding surfaces 14*a*, 14*b* are provided at the radial outer end of the displaceable scaffolding 60; these surfaces are movable toward the left, referring to FIG. 4, when the scaffolding 60 is driven forward to the inner ends of the partition walls between the compartments 12 and exactly line-up the longitudinal axis of the scaffolding 60 to the longitudinal axis of the compartment. Electromagnets 16*a* and 16*b* are fixed at the ends of the guiding surfaces 14*a* and 14*b* and are angularly disposed towards the outside thereof. These electromagnets insure proper positioning of the scaffolding 60. These electromagnets are positioned on counter-surfaces 15*a* and 15*b*, made of magnetizable material, and are fixed at the inner edges of the walls separating the compartments 12 from one another. The scaffolding 60 is secured against movement in longitudinal direction when these electromagnets are energized.

As can be seen in FIGURE 5, the portion 2*a* of the compartment floor 2, which is directed towards the well, is one step lower than the floor so that there is free space under the hoops 65, which are about the height of the higher floor 2. This free space serves to take up the front wheels of vehicles by means of the transfer mechanism 62, which is to be further explained below, or to put them onto the hoops.

FIG. 6 shows, in an enlarged vertical section, the construction of the longitudinally displaceable scaffolding 60. The roadways 60*a* and 60*b*, on which the wheels of the vehicles run, are generally plane surfaces, having their outside edges attached to side walls 60*c* and 60*d*. An outwardly directed horizontal flange is attached to the top of these side walls and at its outward end is bent downward, 60*e* and 60*f*.

Transverse girders 8*c* are fixed spaced apart and parallel to each other on the load-carriage 8 of the elevator. Rotatable rollers 70 are journaled in bearings 70*b* and 70*c* around horizontal axes 70*a*; are positioned on the transverse girders. The tracks 60*a*, 60*b* are positioned on the rollers 70 so that the side walls are generally positioned in proximity thereto.

Supports 63 are fixed at the lateral ends of the transverse girders 8*c*. Inside directed consoles 71*b*, which serve as bearings for guide rollers 71, are provided, rotatable around the axis 71*a*. The rollers 71 touch the inside of the downwards directed flanges 60*e*, 60*f* of the movable scaffolding 60.

In a similar manner, the scaffolding 60 is guided along the outside of the flanges 60*e*, 60*f*, by the rollers 72. These rollers 72 are journaled rotatable around the vertical axis 72*a* on consoles 72*b* at the supports 63.

When the scaffolding, together with the tracks 60*a* and 60*b*, is positioned toward the inside, it is necessary to prevent tilting and to maintain an intermediate space 69 open therebetween and the transverse girders 8*c*. For this purpose, additional rollers 73 are disposed on the supports 63, rotatable around horizontal axis 73*a* and touching the upper side of the flanges 60*e*, 60*f*.

FIG. 7 shows the construction of the transfer mechanism 62 in detail. The arrangement consists of a bar 80, extending between chains 66, which bar is connected at one end 80*a*, for example, at the upper part of the chain 66, and the other end 80*b* connected at the upper part of the chain 66 on the opposite side. At 80*c* and 80*d* a frame, formed as a hoop, is connected by a hinge on the bar 80, which frames consists of parallel lateral stanchions 81*a* and 81*b* and the bar 82, which is connected across the ends of the stanchions. Journalled rollers 83 and 84, rotatable around a horizontal axis, are provided at the end of a bar 82. The rollers 83 and 84 are positioned on the parallel tracks 60*a*, 60*b* of the scaffolding 60. The distance between the two rollers 83 and 84 is accordingly the average track-width of a car to be taken.

Two longitudinally extending stanchions 85*a* and 85*b* extend from the ends of the bar 82, staggered inwards and tightly connected with the bar 82, which are, at their front ends, connected by a cross-stanchion 86 to form a U-shaped frame. The stanchion 86 is laterally extended and slightly bent backward at 86*a* and 86*b*.

A further U-shaped frame, made up of stanchions 88*a*, 88*b*, running in longitudinal direction and parallel the stanchions 81*a* and 81*b*, is fixed at the hinges 87*a* and 87*b* to the lateral stanchions 81*a* and 81*b*. The stanchions 88*a*, 88*b*, aer connected at their front ends by a cross bar 89, on which lateral ends 90*a* and 90*b* journalled rollers are provided. These rollers, as well as the rollers 83 and 84, are supported on the tracks 60*a*, 60*b*. A U-shaped frame is firmly connected to the stanchion 89*a* border, whose lateral stanchions are numbered 91*a* and 91*b*. The stanchions 91*a* and 91*b* are parallel to and of a greater spacing than the stanchions 85*a* and 85*b*. These stanchions 91*a* and 91*b* extend over the cross stanchion 86*a*, 86*b*, are connected with a cross stanchion 86*a* and 86*b*, and are connected with cross stanchion 92, which is parallel thereto. The cross stanchion 92 is extended to both sides, and the extensions 92*a*, 92*b* are bent slightly forward. The wedge-shaped spaces formed in this manner between the extensions 86*a* and 92*a*, and 86*b* and 92*b*, are a little bigger than the space covered by the hoops 65. The stanchions 85*a* and 85*b*, extending in the longitudinal direction, are arranged so far to the center that they can swing down into the intermediate space between the tracks 60*a*, 60*b*.

FIGS. 8*a*, *b* and FIGS. 9*a*, *b*, show the mechanism by which the movements of the scaffolding 60 and the transfer mechanism 62 are coordinated in a simple manner. If a vehicle is to be accepted, the transfer mechanism 62 is in the rear of the outer end of the movable scaffolding 60 (FIG. 10*a*), while the scaffolding 60 is in its pulled-back position. The endless chains 66 serve, as seen in FIGS. 4 and 7, to move the transfer mechanism. Each of two catches 93 and 94 are fixed to the chains, which catches act upon and cooperate with buffers 95, 96 (FIGS. 8*a*, 8*b*), which are fixed at the scaffolding 60. If the chain 66 is rotated so that the upper portion moves from right to left, the scaffolding 60 is taken with over the buffers 95, till the catch 93 runs over the chainwheel 67 and separates from the buffers 95. At the same time, the catch 93 energizes on the magnets 14*a*, 14*b* by tripping of a switch. The scaffolding 60 is thereby moved from the position according to FIG. 10*a* into a position indicated in FIG. 10*b*, and fixed in that position. On further movement of the chain 66 in the same direction, only the transfer mechanism 62 moves forward until the bar 80 runs around the chainwheel 67 and the mechanism 62, pulled now to the right by the lower line of the chain, starts its backward movement. If the vehicle has been transported onto the scaffolding 60 by means of the mechanism 62, which scaffolding remains in its advanced position and is secured by the magnets 14*a*, 14*b*, a second catch 94 which is fixed on the chain 66 further backwards touches buffers 96, which are firmly connected with the scaffolding 60 beneath the lower line of the chain (FIGS. 9*a*, 9*b*). With further movement of the chain 66, the scaffolding 60 is therefore moved back into its starting position. The catches 93 and 94, as well as the buffers 95 and 96, are, as shown in FIG. 8*b* and 9*b*, arranged on different sides of the chain 66. Thereby, it is possible that the catch 93 only touches the buffers 95 and the catch 94 only touches the buffers 96, while the catch 93 passes the buffers 96 and the catch 94 passes the buffers 95 without touching.

The chains 66 are formed as roller-chains and lay at angle profiles 66*a* and 66*b*, which prevent a hanging-down of the chain-lines. In this manner, orderly close cooperation of the catches and buffers is assured.

FIGS. 10*a*–10*h* show the transfer mechanism taking up a vehicle onto the elevator.

Figure 10:
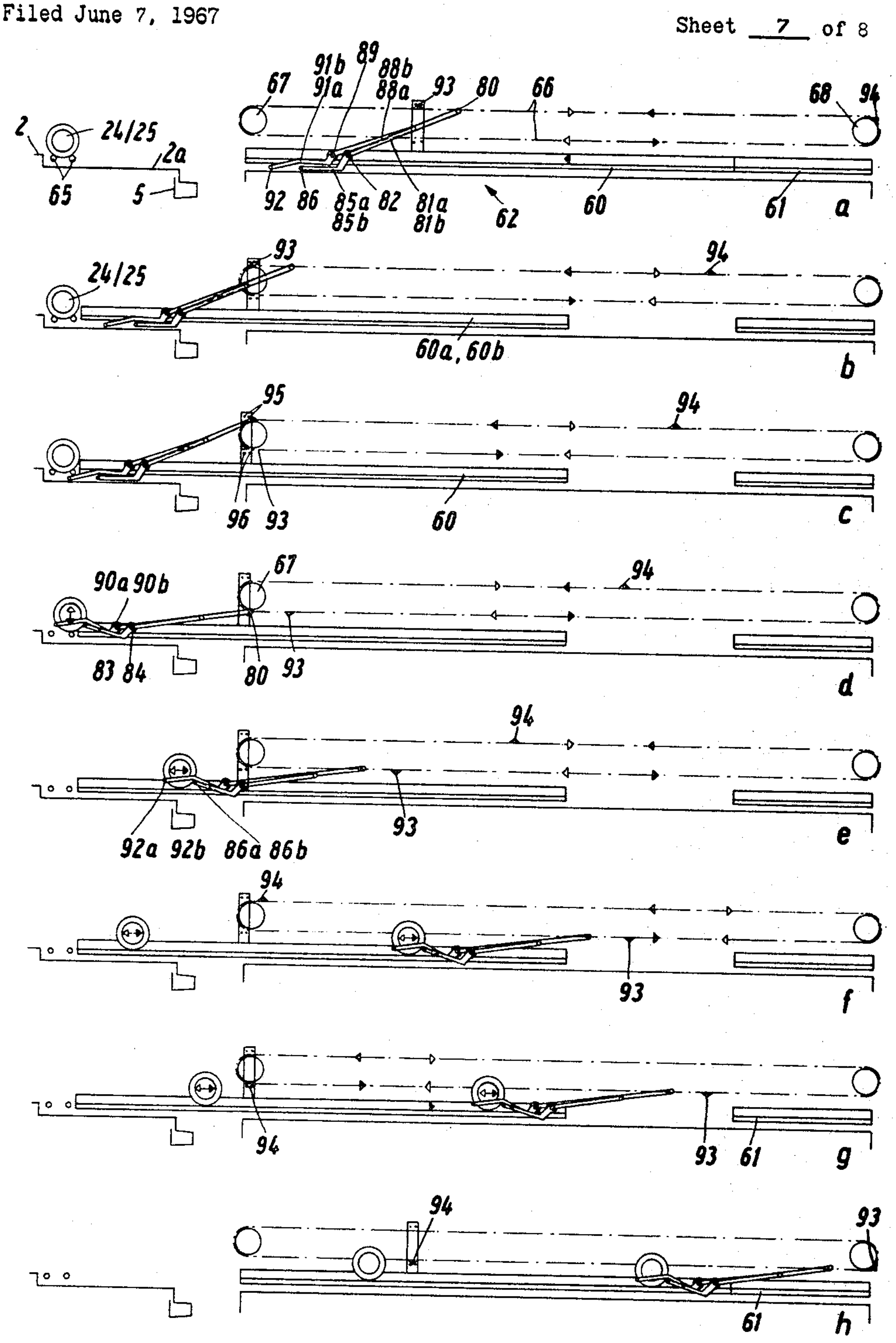

In FIG. 10*a*, the vehicle to be taken up is provided with its front wheels 24, 25 on the hoops 65, which are in the front part of an appropriate compartment. The longitudinally displaceable part 60 of the scaffolding is driven to the stable part 61. In this position the elevator can move up and down in the well 1. By means of the endless chains 66, the transfer mechanism 62 has been brought into the position indicated. The bar 80 extends between the chains and takes its highest possible position. The hoop-shaped frames 81*a*, 81*b*, 82, as well as 88*a*, 88*b*, 89, are therefore inclined toward a front, downwardly directed plane. Thereby, the joining hoop-shaped frames standing over the rollers 83, 84, as well as 90*a*, 90*b*, grab through the intermediate space between the tracks downwards and lay with the extensions 86*a*, 92*a*, and 86*b*, 92*b*, which are outwardly directed under the tracks. The angular bend is selected in such manner that the extensions are close under the tracks without touching them and they keep this position when the transfer mechanism 62 is driven forward or backward by moving the chains 66.

The catches 93 and 94 are arranged one after the other on the chains 66. If the upper lines of chains 66 are moved towards the left, the catches 93 take the displaceable scaffolding part with them to the left, as explained in connection with FIGS. 9*a*, 9*b*. The mechanism therefore goes from the position shown in FIG. 10*a* to the one shown in FIG. 10*b* in which the displaceable scaffolding 60, which is held by the locking means shown in FIGS. vator and compartment and stays with the front end of the tracks 60a, 60b close to the front wheels of the vehicle to be taken up. The difference in height between the lower laying floor 2a and the floor 2 of the other part of the acceptance frame is apportioned in such manner that the displaceable scaffolding with the undercarriage of the transfer mechanism can be moved unhampered until close to the vehicle wheels 24, 25.

When the mechanism has reached the position indicated in FIG. 10*b*, the catches 93 free the displaceable scaffolding 60, which is held by the locking means shown in FIGS. 8*a*, 8*b* in the forward position. If the upper line of chains 66 is moved further to the left, only the transfer mechanism 62 moves forward, so that its front end, with the parts 86a, 86b, 92a, 92b, grabs under the hoops 65 and therewith the vehicle wheels.

If, with further movement of the chains, the bar 80 runs around the chainwheels 67, and if it goes down thereby, the front end of the transfer mechanism comes up by rotation of the rollers 83, 84, 90a, 90b, around the axis. The distance between the lines of each chain 66 and the axis of the chainwheels 67 have been selected so that the front end of the transfer mechanism has taken up the front wheels of the vehicle at the hoops 65 if, according to FIG. 10*d*, the bar 80, after going around the chainwheels 67, begins to move back with the lower portion of the chain.

As FIG. 10*e* shows, the vehicle is pulled on the scaffolding by its front wheels, with the displaceable scaffolding maintaining its position, and the fork-shaped extensions 86a, 86b, 92a, and 92b hold the front wheels and move over the upper side of the track.

The vehicle is transported onto the displaceable scaffolding until, as indicated in FIGS. 10*f* and 10*g*, the back wheels 27, 28 have also been positioned on the scaffolding after rolling over the hoops 65. Then the second catch 94 starts acting, connecting the displaceable scaffolding 60 with the chains 66 and moving the scaffolding back again to the immobile part of the scaffolding 61. The mechanism takes the position indicated in FIG. 10*h*. The elevator is now ready to drive on the spiral guide track 5 to another level. The unloading of the vehicle from the elevator is executed here as described by means of the FIGS. 10*a–h*, but only in reversed sequence of the above set forth procedures.

In FIGS. 11*a* and 11*b*, a wheel arrangement according to FIG. 3*b* is shown in greater detail. The wheel arrangement consists of a frame 99 in which the wheel 6a, rolling on the upper side of the helical track 5, as well as the wheel 6b, rolling against the lower side of the same track, are journaled. The wheel 6a, running above, is driven by the motor 11. The lower wheel 6b runs idle and is pushed against the lower side of the track 5 by the adjustable force of springs 97. The arrangement of the idle wheel 6b enables the elevator to be provided with a counterweight, which is preferably heavier than the dead-weight of the elevator and which, for example, exceeds the latter by the weight of an average heavy vehicle.

If the counterweight selected is so great that more than the total weight of the elevator is compensated, the undercarriage tries to lift from the track 5. It is hampered from doing this by the lower wheels 6b. The arrangement of springs 97, which keeps the wheel 6b at the lower side of the track 5, provides that the driven wheel 6a of the wheel-arrangement does not lose the contact to the surface of the track 5, because otherwise the drive 11 would be ineffective. The providing of a counterweight enables the saving of drive-energy.

The wheel 6c, serving for the centric guidance of the elevator and also journaled in the frame 99, is also kept against the inner surface 5c of the track 5 by a spring arrangement 98.

The wheels 6a, *b*, *c* are fitted with rubber tires in the shown example and run on smooth surfaces of the track 5, which, for example, is made from concrete. In order to be able to change the wheels 6a, *b*, *c*, if necessary, they are each attached in a known manner after the fashion of automobile wheels.

The rectangular frame 99, in which the three wheels of the wheel arrangement are journaled, can be fixed, according to FIGS. 3*a*, 3*b*, 3*c*, on different levels at the ends of the arms 7*a*, 7*b*, 7*c* of the undercarriage 7.

A modified manner of execution for the arrangement of the wheels of the wheel-arrangement is shown in FIGS. 12*a* and 12*b*. Hereby, a guide 105, U-shaped in section, is used for the elevator. The open side of the channel, formed by the U-shaped guide, is inwardly directed. The wheel-arrangement again consists of three wheels, of which the wheels 106a and 106b are rotatable around horizontal axes and the third wheel 106c is rotatable around an axis which is bent over slightly towards the vertical. The inclined position of the wheel 106c is adequate to the rise of the helical guide 105.

The wheel 106b is arranged a little higher than the wheel 106a and runs on the inner side of the above laying flanges 105b of the guide 105. The lower arranged wheel 106a is supported by the flange 105a laying below the guide, while the wheel 106c rolls on the ground of the lowered part of the guide 105c between both flanges. Also, in this kind of wheel arrangement, it is possible to provide weight compensation by a counterweight which exceeds the dead-weight of the elevator, because the elevator is secured against lifting from the guide track and the driven wheel stays in touch with the running surface.

The arrangement according to the invention can also be executed in that manner in which the elevator E forms a ring running on a helical guide arranged outside of a building-core, while the compartments, also arranged on a helical path, are disposed radially in the building-core and are accessible from the outside.

What is claimed is:

1. In a multi-story building having an elevator shaft therein, a helical track disposed around said shaft and a multiplicity of storage compartments disposed in helical array about said shaft, an elevator mounted in said shaft, said elevator comprising an under-carriage with at least three radially spaced elongated lattice type arms with means adjacent the ends thereof disposed in guided engagement with said helical track, means mounted on said under-carriage for moving same along said helical track and simultaneously rotating said under-carriage about a vertical axis in said shaft, load supporting means pivotally mounted on said under-carriage, means for rotating said load supporting means, and means to extend and retract said transfer means relative to said load supporting means to deposit and retrieve a load respectively from said storage compartment.

2. The combination, as claimed in claim 1, wherein each of said arms are operatively associated with said helical guide track through a three wheel combination, all of which wheels being adapted to be positioned against said helical track; with one of said wheels adapted to bear against an upper face of said track, another of said wheels adapted to bear against a lower face of said track and the third of said wheels adapted to bear against an interiorly directed face of said track.

3. The combination, as claimed in claim 1, wherein said load-supporting means is adapted to be disposed in a substantially horizontal position.

4. The combination, as claimed in claim 1, having a counterweight operatively associated therewith.

5. The combination as claimed in claim 1 wherein said transfer means is extendable to a distance greater than the length of any of said arms.

6. The combination as claimed in claim 1 wherein said under-carriage is adapted to rotate along said helical track and said load-supporting means is adapted to counter-rotate with respect to said undercarriage and is therefore adapted to maintain a predetermined alignment with respect to said track.

7. The combination as claimed in claim 1 wherein said transfer means is adapted to extend radially with respect to said track.

8. The combination as claimed in claim 1 wherein said transfer means is chain-driven.

9. The combination as claimed in claim 1 wherein said transfer means comprises an angularly bent frame mounted on wheels with two fork means at the end thereof remote from said load-supporting means.

10. The combination claimed in claim 1, having a pair of spaced hoops mounted on the floor of each compartment, adapted to receive a pair of wheels of a vehicle.

11. The combination claimed in claim 10 wherein said hoops are adapted to be operatively associated with said transfer means.

References Cited

UNITED STATES PATENTS

| | | | |
|---|---|---|---|
| 1,709,914 | 4/1929 | Klanke | 214—16.1 |
| 1,772,110 | 8/1930 | Randle | 214—16.1 |
| 2,691,448 | 10/1954 | Lontz | 214—16.1 |

FOREIGN PATENTS

| | | |
|---|---|---|
| 857,687 | 12/1952 | Germany. |
| 991,691 | 5/1965 | Great Britain. |

GERALD M. FORLENZA, *Primary Examiner.*

R. B. JOHNSON, *Assistant Examiner.*

U.S. Cl. X.R.

187—25

UNITED STATES PATENT OFFICE

CERTIFICATE OF CORRECTION atent No. 3,419,162 December 31, 1968

Carl Heinrich Hagel

It is certified that error appears in the above identified patent and that said Letters Patent are hereby corrected as shown below:

Column 8, lines 74 and 75, ", which is held by the locking means shown n FIGS. vator" should read -- bridges over the imtermediate space between levator --.

Signed and sealed this 31st day of March 1970.

(SEAL)
Attest:

Edward M. Fletcher, Jr.
Attesting Officer

WILLIAM E. SCHUYLER, JR.
Commissioner of Patents